Patented Aug. 17, 1948

2,447,124

UNITED STATES PATENT OFFICE 2,447,124

FUEL CONTROL FOR POWER PLANTS

Andrew Kalitinsky, Eagleville, and Donald E. Meitzler, Manchester, Conn., assignors to United Aircraft Corporation, East Hartford, Conn., a corporation of Delaware Application April 15, 1944, Serial No. 531,304

9 Claims. (Cl. 60—13)

1

This invention relates to controls for an aircraft power plant which includes generators constituting a source of gas under pressure and a turbine operated by the gas under pressure and driving a propeller. The turbine may discharge through a thrust nozzle.

In this type of power plant the gas generators may be engine-and-compressor units with the compressor supplying scavenge air for the engine, and the exhaust gas from the engine being the gas which drives the turbine. An object of this invention is the automatic adjustment of the fuel supply to the generators.

If this type of power plant is designed for operation at high altitudes it is less efficient at low altitudes and at sea level so that for any selected part of the power range a smaller quantity of fuel is necessary at higher altitudes. A feature of the invention is the automatic adjustment of the fuel supply for reducing the quantity of fuel as a function of altitude.

Another feature of the invention is an arrangement which will permit the use of a single control member which will have the same range of motion from idling to full power independently of altitude.

A burner may be incorporated in this type of power plant between the generators and the turbine for increasing the total power over a part of the power range. An object of this invention is to control the operation of the burner automatically so that fuel is supplied to the burner through a selected portion of the power range. Another feature is the interconnection of the control so that a single control member adjusts the supply of fuel to both generators and burner.

When the burner is in operation it is possible for the gas to reach a temperature above the safe operating temperature for the turbine. A feature of this invention is a temperature control to adjust the supply of fuel to the burner as a function of the temperature at the inlet to the turbine.

Other objects and advantages will be apparent from the specification and claims, and from the accompanying drawings which illustrate an embodiment of the invention.

2

Figure 1:
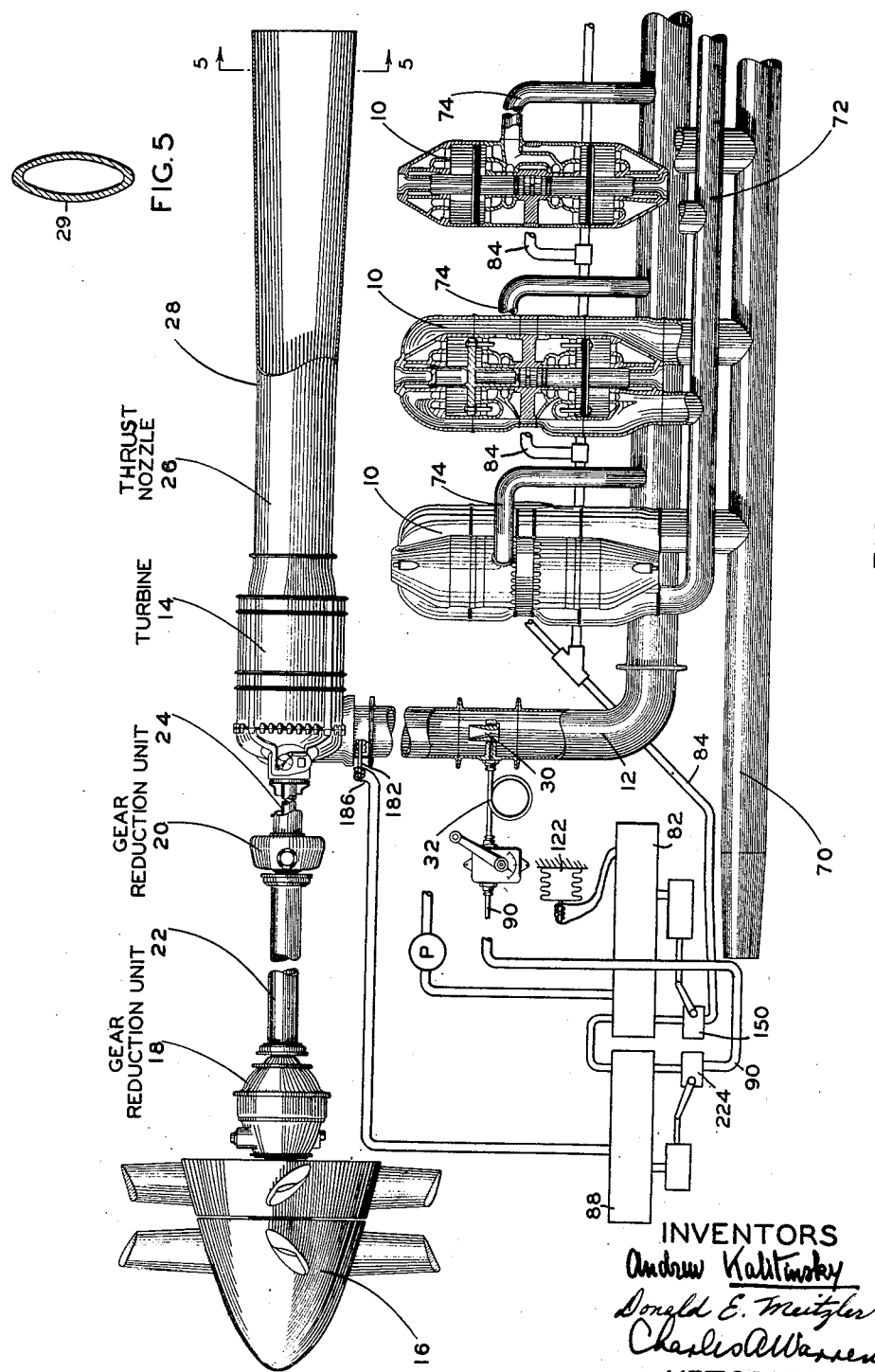
Fig. 1 is a diagrammatic view of the power plant.

Fig. 5 is a sectional view on line 5—5 of Fig. 1.

Figure 6:
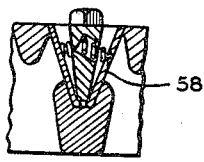

Fig. 6 is a sectional view through one of the intake valves.

The generators 10 supply hot gas under pressure through a duct 12 to the intake of the turbine 14. The latter is connected to a propeller system 16 through gear reduction units 18 and 20 and shafts 22 and 24. The turbine exhaust discharges as a jet through a restricted nozzle 26 which may be directed rearwardly of the aircraft to produce an additional propulsive thrust.

The thrust nozzle 26 is circular in cross section as far as 28, and from that point on the cross sectional area is restricted by flattening the nozzle toward the plane of the paper, as shown at 29 in Fig. 5.

The gas is heated between the generators and the turbine by discharging fuel into duct 12 through a fuel nozzle 30 supplied by a fuel line 32. Fuel is admitted at a point spaced far enough from the turbine to assure complete burning of the fuel before the power gas has reached the turbine inlet.

Figure 2:
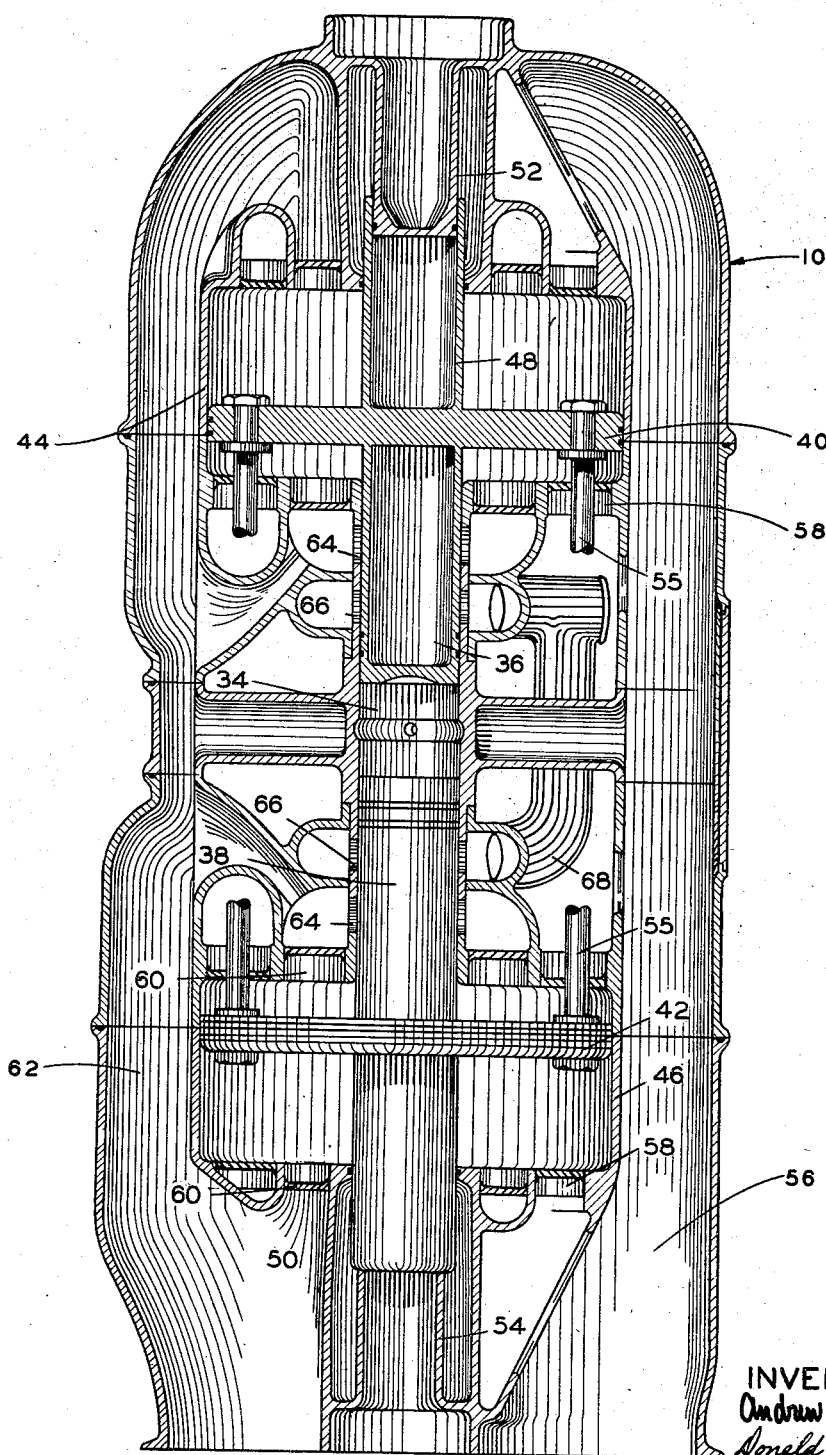
Fig. 2 is a sectional view on a larger scale of one of the generators.

As shown in Fig. 2 each generator 10 is in the form of a free-piston engine-and-compressor unit comprising an engine cylinder 34 having reciprocating pistons 36 and 38 to which compressor pistons 40 and 42 in cylinders 44 and 46 are integrally connected. Sleeves 48 and 50 attached to the compressor pistons complete the reciprocating piston assemblies. The sleeves, in combination with pistons 52 and 54 over which they reciprocate, form air spring cylinders.

The piston assemblies are moved apart by the burning of the fuel injected into the engine cylinder between the engine pistons. Air compressed in the air spring cylinders on the power stroke returns the piston assemblies. The assemblies are maintained at equal distances from the center of the engine cylinder by a linkage of which rods 55 may form a part.

Intake manifold 56 conducts air to sets of intake valves 58, as shown in Fig. 6, through which air alternately enters opposite ends of the compressor cylinders. The compressed air leaves the cylinders through sets of discharge valves 60 also at opposite ends of the compressor cylinders and passes through scavenge manifold 62 and through ports 64 which are uncovered by pistons 36 and 38 at the end of the power stroke. Air entering these ports is blown through the engine cylinder and discharges through exhaust ports 66 into exhaust manifolds 68, Fig. 2.

The intake manifolds of the several units are connected to an intake duct 70, Fig. 1. The scavenge manifolds are interconnected by a pipe 72. The exhaust gases flow from the exhaust manifolds through pipes 74 into duct 12.

Figure 3:
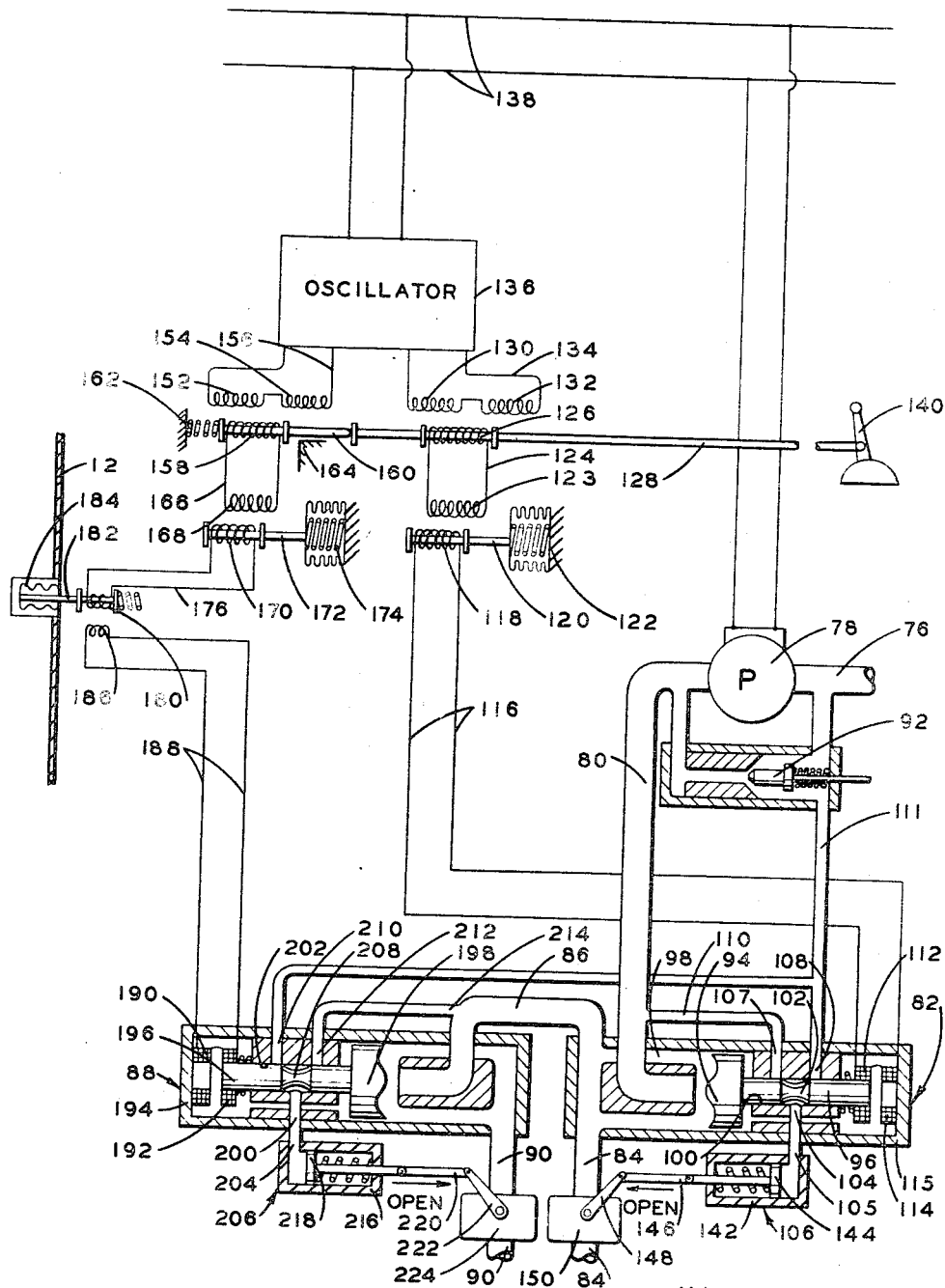
Fig. 3 is a diagram of the controls by which the fuel supply is adjusted.

Referring to Figure 3, fuel for the generators and the burner is delivered from a supply, not shown, through a pipe 76 to a pump 78. From this pump, fuel flows through a conduit 80 to a control device 82 by which the total fuel flow to the power plant is measured. From control device 82, fuel flows through a conduit 84 to the injection devices for the generators 10. Fuel from the device 82 also discharges through a conduit 86 to a control device 88. From device 88 a conduit 90 directs fuel to line 32 and thence to the burner nozzle 30.

Pressure in the supply conduit 80 is adjusted by a relief valve 92 in a bypass for the pump. Fuel entering device 82 discharges against the head 94 of a plunger 96 and is directed by this head through an annular path 98 to conduits 84 and 86. Plunger 96 slides in a bore 100 and has a groove 102 in line with a port 104 connected by a conduit 105 to a device 106 by which to adjust the quantity of fuel utilized by the generators. Groove 102 alternately connects port 104 with a supply port 107 or a vent port 108. Port 107 is connected by a conduit 110 to conduit 80 so that a part of the fuel in this conduit functions as the control fluid. Vent port 108 may be connected by a duct 111 to conduit 76.

The end of plunger 96 has an induction coil 112 in spaced relation to a stationary coil 114 in the end of the casing 115 for device 82. These coils have bucking fields and the plunger 96, which adjusts the supply of control fluid to device 106 is moved by a change in the repulsive effect between these coils. Coils 112 and 114 are connected in series and in opposition in a circuit 116 which includes an induction coil 118 carried by a projecting rod 120 on a pressure-sensitive bellows 122.

In a fixed position, in parallel relation to coil 118, is a coil 123 in a circuit 124 which includes a coil 126 on a rod 128. Coil 126 is movable relative to opposed coils 130 and 132 having bucking fields in a circuit 134 including an oscillator 136 receiving power from lines 138.

Rod 128 is connected to a control lever 140 by which the fuel supply is adjusted. Movement of lever 140 places coil 126 more or less in line with coil 130 and out of a position to be affected by coil 132, thus varying the induced voltage in coil 126. The repulsive effect between coils 112 and 114 increases as coil 126 is moved to the left, causing plunger 96 to move to the left and connect supply port 107 to port 104 thereby admitting fluid under pressure to the device 106. This device operates to control the quantity of fuel delivery to the generators. If the atmospheric pressure decreases, coil 118 is moved more or less out of direct alignment with coil 123 decreasing the induced voltage in coil 118 and thus decreasing the repulsive effect between coils 112 and 114. Plunger 96 then moves to the right to connect port 104 and vent 108 and decreases the fuel supply to the generators.

Device 106 includes a cylinder 142 and piston 144, the latter being connected by a link 146 to the arm 148 of a valve 150 by which the flow through conduit 84 may be adjusted. When plunger 96 is moved to the left to increase the fuel flow to the generators, groove 102 connects ports 107 and 104 to direct fluid to device 106 to cause opening of valve 150.

The burner fuel flow is similarly controlled.

Coils 152 and 154, with bucking fields, are in series in a circuit 156 which includes the oscillator 136. A coil 158 is movable with respect to coils 152 and 154, being carried on a rod 160, the end of which is in a position to be engaged and moved by rod 128 during its movement to the left. A spring 162 moves rod 160 toward the right against a stop 164 so located that when rod 128 moves toward the right, rod 160 will be stopped when coil 158 is midway between the opposed coils 152 and 154. In this position no voltage is induced in the circuit 166 which includes coil 158 and a stationary coil 168.

Coil 168 is adjacent to a movable coil 170 on a rod 172 extending from a pressure sensitive bellows 174 which moves coil 170 more or less out of direct opposition to coil 168 in response to changes in atmospheric pressure.

Coil 170 is in a circuit 176 which includes a movable coil 180 on a rod 182 extending from a temperature-sensitive element 184 mounted in duct 12 adjacent to the turbine intake. As the temperature in duct 12 increases by burning fuel in the duct, coil 180 is moved with respect to a fixed coil 186, thereby decreasing the induced voltage in a circuit 188 which includes the repulsion coils 190 and 192. Coil 190 is mounted in the end of a casing 194 for the device 88. Coil 192 is mounted on a plunger 196 projecting from the head 198 against which the burner fuel is discharged from duct 86.

A port 200 entering the bore 202 in which plunger 196 slides is connected by conduit 204 to a device 206 actuated by device 88. A groove 208 in plunger 196 alternately connects this port to a vent port 210 or to a supply port 212, the latter being connected by a conduit 214 to conduit 86. As the repulsive effect between coils 190 and 192 is increased, as by motion of coil 158 to the left, plunger 196 is moved to the right to open valve 224 and thereby increase the supply of control fluid through device 88 to the device 206. The neutral position of the plunger in which both ports 210 and 212 are covered is restored by the increasing thrust on head 198 resulting from the increased flow of fuel against the head and into the conduit 90.

Device 206 includes a cylinder 216 and piston 218, the latter being connected by a link 220 to the arm 222 of a valve 224 in conduit 90. When plunger 196 is moved to the right to increase the fuel flow to the burner, groove 208 connects ports 200 and 212 to direct fluid to device 206 to open valve 224.

Figure 4:
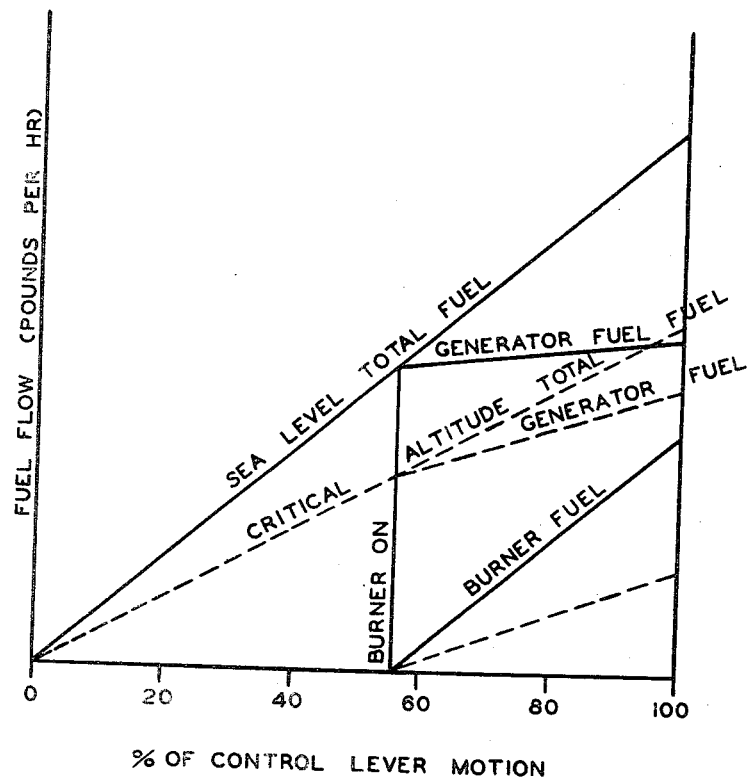
Fig. 4 is a diagram showing the operation of the controls.

The above described controls obtain the results shown on the graph of Fig. 4. As shown, the total fuel is controlled proportionally to the the movement of the control lever through the action of the bucking field coils 130 and 132 on the movable coil 126. The movement of coil 126 varies the repulsive effect between coils 112 and 114 to procure adjustment of valve 150. The change in the flow rate resulting from adjustment of valve 150 changes the pressure on head 94 to balance the repulsive effort and reset plunger 96 to maintain the desired valve adjustment.

Coil 118, which is moved by the atmospheric bellows 122 acts to reduce the quantity of fuel with increasing altitude, so that, as shown in Fig. 4, a smaller quantity of total fuel is supplied at a predetermined setting of the control lever. This is advantageous in assuring efficient operation of the power plant at the altitude for which it is designed.

The controls also provide for starting the burner at a predetermined position of the control lever, and for subtracting the burner fuel from the total fuel so that the total fuel will still be a straight-line function as shown. This is accomplished by having control rod 128 pick up and move rod 160, on which coil 158 is mounted, at a predetermined point in the control lever motion. The atmospheric bellows 174 reduces the burner fuel with increasing altitude, in the same manner that bellows 122 controls total fuel. It will be understood that the sea-level and critical altitude curves on the graph represent operation at these particular altitudes, and that proportionate adjustments occur between these altitudes.

Coil 180, movable in response to changes in the burner temperature, provides for reducing the burner fuel as the temperature approaches the desired limit, and prevents an excessive temperature at the turbine inlet.

The arrangement of the devices 82 and 88 so that fuel enters these devices to discharge against heads 94 and 198 permits these devices to measure the fuel flow. Since the head 94 is acted upon by the total fuel flow, the thrust on this head is proportional to the total fuel and is an indication of the fuel quantity. This thrust is balanced, as will be understood by the repulsive effort between coils 112 and 114. If the flow changes, the change in thrust on head 94 will cause plunger to move and adjust the control valve 150. Similarly, the thrust on head 198 measures the burner fuel flow and the setting of valve 224 is changed by changes in the thrust on head 198.

It is to be understood that the invention is not limited to the specific embodiment herein illustrated and described, but may be used in other ways without departure from its spirit as defined by the following claims.

We claim:

1. A fuel control for a power plant including at least one gas generator, a burner for adding heat to the gas, and a hot gas motor driven by the gas, in combination with means for adjusting the supply of total fuel to the power plant, a control lever for said fuel adjusting means, and means independent of the control lever for reducing the quantity of fuel supplied in response to a decrease in atmospheric pressure whereby the control lever will have the same position for the same power at all altitudes.

2. A fuel control for a power plant including a number of gas generators, a burner for adding heat to the gas from the generators, and a hot gas motor driven by the gas, said fuel control including a pump, means for supplying fuel to the power plant, means for controlling the supply of total fuel delivered by the pump, a control lever for adjusting said controlling means, and means for diverting a part of the total fuel to the burner above a predetermined setting of the control lever.

3. A fuel control for a power plant including a number of gas generators, a burner for adding heat to the gas from the generators, and a hot gas motor driven by the gas, said fuel control including a pump, means for supplying fuel to the power plant, means for controlling the total supply of fuel from the pump both to generators and to burner, a control lever for adjusting said controlling means, and means for directing to the burner a part of the fuel delivered by said controlling means at a predetermined setting of the control lever.

4. A fuel control for a power plant including a number of gas generators, a burner for adding heat to the gas from the generators, a hot gas motor driven by the gas, said fuel control including means for supplying fuel to the power plant, means for controlling the supply of fuel, a control lever for adjusting said controlling means, means for directing to the burner a part of the fluid delivered by said controlling means at a predetermined setting of the control lever, and means for adjusting the quantity of fuel in response to changes in atmospheric pressure.

5. A fuel control for a power plant including a number of gas generators, a burner for adding heat to the gas from the generators, a hot gas motor driven by the gas, said fuel control including means for supplying fuel to the power plant, means for controlling the supply of fuel, a control lever for adjusting said controlling means, means for directing to the burner a part of the fluid delivered by said controlling means at a predetermined setting of the control lever, and means responsive to changes in the temperature of the gas in the burner for adjusting the quantity of fuel delivered to the burner.

6. A power plant including a number of free-piston units generating gas under pressure, a burner for adding heat to the generated gas, and a device driven by the gas, in combination with a pump, means for adjusting the total supply of fuel from the pump to the power plant, a control lever for said adjusting means, and means for directing a part of said total supply to the burner over a predetermined part of the power range.

7. A power plant including a number of free-piston units generating gas under pressure, a burner for adding heat to the generated gas, and a device driven by the gas, in combination with a pump, means for adjusting the total supply of fuel from the pump to the power plant, means for directing a part of said total supply to the burner over a predetermined part of the power range, and means responsive to changes in temperature of gas in the burner for adjusting the quantity of fuel delivered to the burner.

8. A power plant including at least one gas generator, a burner for adding heat to the generated gas, means for controlling the total fuel supply to the power plant, and other means for controlling the burner fuel supply, in combination with means for adjusting the total fuel supply in response to changes in atmospheric pressure, and other means for adjusting the burner fuel supply in response to changes in atmospheric pressure.

9. A power plant including at least one gas generator, a burner for adding heat to the generated gas, means for controlling the total fuel supply to the power plant, other means for controlling the burner fuel supply, and a control lever for both of said means, in combination with means for adjusting the total fuel supply in response to changes in atmospheric pressure, and other means for adjusting the burner fuel supply in response to changes in atmospheric pressure, both of said adjusting means being independent of the control lever.

ANDREW KALITINSKY.
DONALD E. METTZLER.

(References on following page)

REFERENCES CITED

The following references are of record in the file of this patent:

UNITED STATES PATENTS

| Number | Name | Date |
|---|---|---|
| 1,560,642 | Barbarou | Nov. 10, 1925 |
| 2,238,905 | Lysholm | Apr. 22, 1941 |
| 2,265,961 | Ziebolz | Dec. 9, 1941 |
| 2,292,288 | Pateras Pescara | Aug. 4, 1942 |

FOREIGN PATENTS

| Number | Country | Date |
|---|---|---|
| 274,441 | Great Britain | Aug. 30, 1928 |
| 349,209 | Great Britain | May 28, 1931 |
| 183,759 | Switzerland | July 16, 1936 |